(12) United States Patent
Choi et al.

(10) Patent No.: US 8,203,687 B2
(45) Date of Patent: Jun. 19, 2012

(54) DISPLAY SUBSTRATE AND LIQUID CRYSTAL DISPLAY PANEL HAVING THE SAME

(75) Inventors: Nak-Cho Choi, Seoul (KR); Hee-Ra Bae, Yongin-si (KR); Mee-Hye Jung, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 508 days.

(21) Appl. No.: 12/488,340

(22) Filed: Jun. 19, 2009

(65) Prior Publication Data

US 2010/0007808 A1    Jan. 14, 2010

(30) Foreign Application Priority Data

Jul. 9, 2008  (KR) .................. 10-2008-0066316

(51) Int. Cl.
*G02F 1/1333* (2006.01)
*G02F 1/1337* (2006.01)
*G02F 1/1343* (2006.01)

(52) U.S. Cl. ......... 349/158; 349/129; 349/139; 349/146

(58) Field of Classification Search ................ 349/158, 349/129, 139, 146
See application file for complete search history.

(56) References Cited

U.S. PATENT DOCUMENTS 7,554,622 B2 *  6/2009  Nakanishi et al. .............. 349/48
8,059,243 B2 * 11/2011  Kim et al. ..................... 349/129

\* cited by examiner

*Primary Examiner* — Mike Qi
(74) *Attorney, Agent, or Firm* — Innovation Counsel LLP

(57) ABSTRACT

One or more embodiments of a display substrate include a base substrate and a pixel electrode. The base substrate has a pixel area defined thereon. The pixel electrode includes a low pixel electrode formed in the pixel area to receive a first voltage, a high pixel electrode spaced apart from the low pixel electrode along a first direction to receive a second voltage that is higher than the first voltage, and a liquid crystal molecule control part formed on at least one of the low and high pixel electrodes so as to control liquid crystal molecules disposed at an area corresponding to a boundary of the low and high pixel electrodes. The liquid crystal molecules disposed at a domain corresponding to a boundary between the low and high pixel electrodes may be controlled, so that the generation of stains or afterimages may be prevented at a boundary of domain areas.

19 Claims, 11 Drawing Sheets

DISPLAY SUBSTRATE AND LIQUID CRYSTAL DISPLAY PANEL HAVING THE SAME

PRIORITY STATEMENT

This application claims priority under 35 U.S.C. §119 to Korean Patent Application No. 2008-66316, filed on Jul. 9, 2008 in the Korean Intellectual Property Office (KIPO), the contents of which are herein incorporated by reference in their entirety.

BACKGROUND

1. Technical Field

Example embodiments of the present invention generally relate to a display substrate and a liquid crystal display (LCD) panel having the display substrate. More particularly, example embodiments of the present invention relate to a display substrate used in a substrate of an LCD device and an LCD panel having the display substrate.

2. Description of the Related Art

Generally, a liquid crystal display (LCD) panel includes a display substrate having a plurality of switching elements formed thereon, an opposite substrate and a liquid crystal layer formed between the display substrate and the opposite substrate.

The liquid crystal molecules of the LCD apparatus have anisotropy so that the image display quality of the LCD apparatus is displayed based on a viewing angle. A conventional LCD apparatus has a narrower viewing angle than other types of display apparatuses.

Therefore, in order to improve the viewing angle, various LCD apparatuses have been developed. For example, in order to overcome the viewing angle problem, a patterned vertical alignment (PVA) mode LCD apparatus and a super patterned vertical alignment (SPVA) mode LCD apparatus have been developed, which divide one pixel into multiple domains and drive the multiple domains.

The PVA mode is a technology in which a common electrode formed on an upper substrate and a pixel electrode formed on a lower substrate are patterned to form a multi-domain. The SPVA mode is a technology in which one pixel is divided into plural sub-pixels to apply the different pixel voltage to the divided sub-pixels.

However, as described above, when a slit pattern or a protruding pattern is formed to form multi-domains, an additional process is required in order to form a slit pattern or a protruding pattern. In addition, a residual image and a stain are generated in the slit pattern or the protruding pattern.

Recently, a technology in which the slit pattern or the protruding pattern is not formed in order to realize multiple domains through a light alignment has been developed. When the multi-domain is formed through the light alignment, a singular point on which a director of liquid crystal molecules is converged between domains is generated. However, a generating position of the singular point is irregular, so that an area between domains may be varied. Moreover, a residual image may be generated at a domain boundary or a stain may remain on a screen when the screen is touched.

Moreover, an arrangement angle of liquid crystal molecules is not controlled in a boundary area between domains, thereby decreasing light transmittance at a domain boundary area.

SUMMARY

Example embodiments of the present invention provide a display substrate capable of preventing an after image and display defects from being generated.

Example embodiments of the present invention provide a liquid crystal display (LCD) panel having the above-mentioned display substrate capable of preventing an after image and display defects from being generated.

Example embodiments of the present invention provide a display substrate having enhanced transmittance.

Example embodiments of the present invention provide an LCD panel having the above-mentioned display substrate having enhanced transmittance.

According to one embodiment of the present invention, a display substrate includes a base substrate and a pixel electrode. The base substrate has a pixel area defined thereon. The pixel electrode includes a low pixel electrode formed in the pixel area to receive a first voltage, a high pixel electrode spaced apart from the low pixel electrode along a first direction to receive a second voltage that is higher than the first voltage, and a liquid crystal molecule control part formed on at least one of the low and high pixel electrodes so as to control liquid crystal molecules disposed at an area corresponding to a boundary of the low and high pixel electrodes.

In an example embodiment of the present invention, a pixel area where the low pixel electrode is formed may include a plurality of areas spaced apart from each other along the first direction to be electrically connected to each other. The areas may be formed at both portions of the high pixel electrode.

According to another embodiment of the present invention, a liquid crystal display (LCD) panel includes a display substrate, an opposite substrate and a liquid crystal layer. The display substrate includes a pixel electrode. The pixel electrode includes a low pixel electrode, a high pixel electrode and a liquid crystal molecule control part. The low pixel electrode receives a first voltage. The high pixel electrode is spaced apart from the low pixel electrode along a first direction to receive a second voltage that is higher than the first voltage. The liquid crystal molecules control part is formed on at least one of the low and high pixel electrodes so as to control liquid crystal molecules disposed at an area corresponding to a boundary of the low and high pixel electrodes.

In an example embodiment of the present invention, a pixel area on which the low and high pixel electrodes are formed may be divided into plural domains along a direction where a director of liquid crystal molecules of the liquid crystal layer is arranged when an electric field is applied thereto.

According to still another embodiment of the present invention, a display substrate includes a base substrate, a low pixel electrode and a high pixel electrode. The base substrate has a pixel area defined thereon. The low pixel electrode is formed on the pixel area to receive a first voltage. The high pixel electrode is spaced apart from the low pixel electrode along a first direction to receive a second voltage that is higher than the first voltage. The high pixel electrode is inclined in an inclined direction with respect to the first direction so as to control liquid crystal molecules disposed at an area corresponding to a boundary of the low and high pixel electrodes.

In an example embodiment of the present invention, the low pixel electrode may be inclined in the inclined direction.

According to further still another embodiment of the present invention, a liquid crystal display panel includes a display substrate, an opposite substrate and a liquid crystal layer. The display substrate includes a low pixel electrode which receives a first voltage and a high pixel electrode spaced apart from the low pixel electrode along a first direction to receive a second voltage that is higher than the first voltage. The high pixel electrode is inclined along an inclined direction with respect to the first direction so as to control liquid crystal molecules disposed at an area corresponding to a boundary of the low and high pixel electrodes. The opposite substrate includes a common electrode. The liquid crystal layer is interposed between the display substrate and the opposite substrate.

In an example embodiment of the present invention, the low pixel electrode may be inclined in the inclined direction According to one or more embodiments of a display substrate and an LCD panel having the display substrate, liquid crystal molecules disposed at a domain corresponding to a boundary between the low and high pixel electrodes may be controlled, so that the generation of stains or afterimages may be prevented at a boundary of domain areas. Moreover, at least one of the low and high pixel electrodes may be formed at an incline, so that liquid crystal molecules disposed at a domain corresponding to a boundary between the low and high pixel electrodes may be controlled so that light transmittance may be enhanced at a domain boundary.

BRIEF DESCRIPTION OF THE DRAWINGS

The above and other features and advantages of the embodiments of the present invention will become more apparent by describing detailed example embodiments thereof with reference to the accompanying drawings, in which.

DETAILED DESCRIPTION

Figure 1:
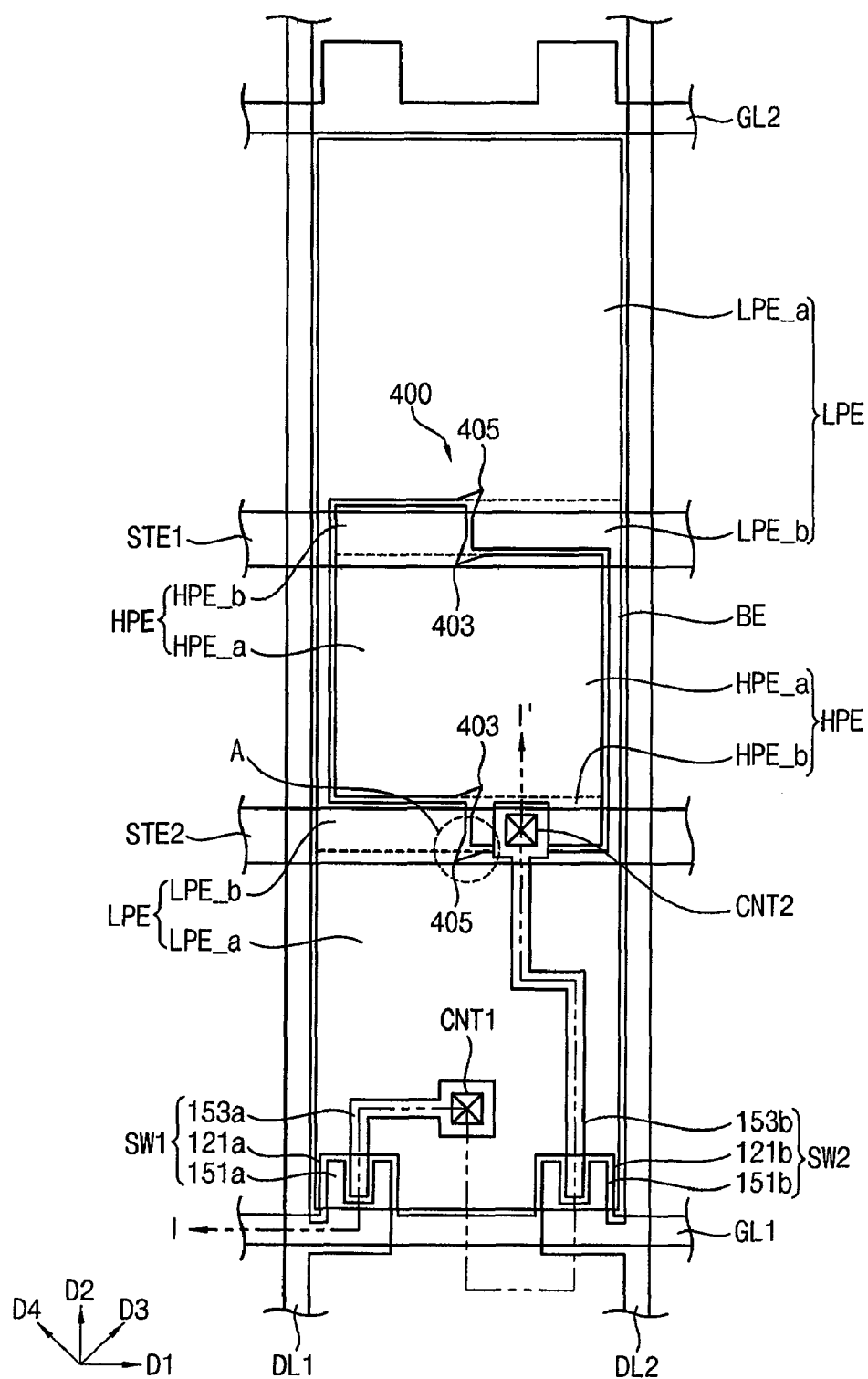
FIG. 1 is a plan view illustrating a liquid crystal display (LCD) panel according to Embodiment 1 of the present invention.

Embodiments of the present invention are described more fully hereinafter with reference to the accompanying drawings, in which example embodiments of the present invention are shown. The present disclosure may, however, be embodied in many different forms and should not be construed as limited to the example embodiments set forth herein. Rather, these example embodiments are provided so that this disclosure will be thorough and complete, and will fully convey the scope of the present disclosure to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" may encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present disclosure. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present disclosure.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present invention will be explained in detail with reference to the accompanying drawings.

Example Embodiment 1

Figure 2:
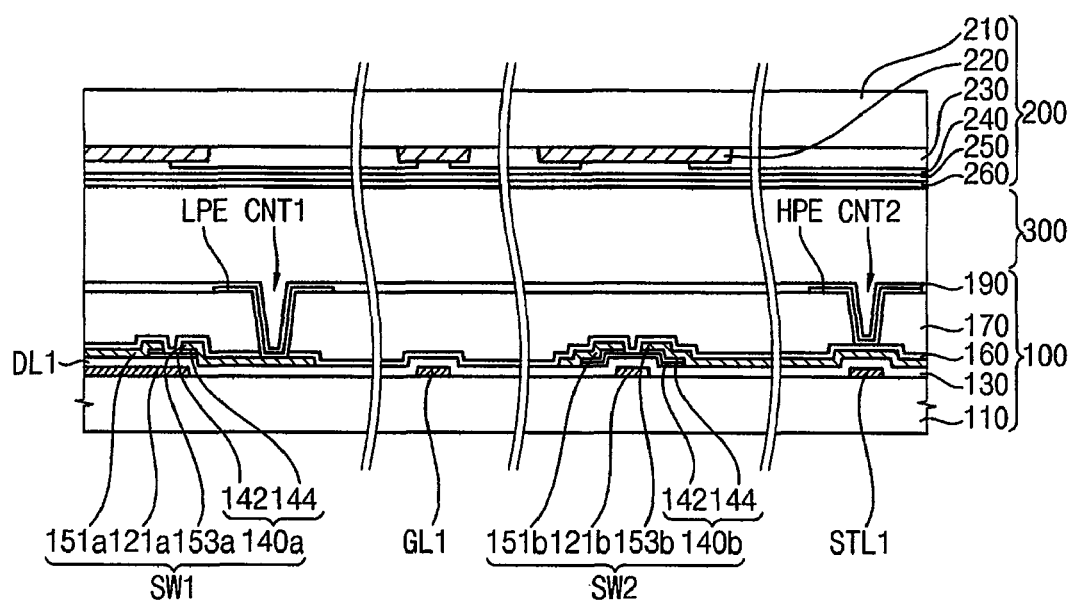
FIG. 2 is a cross-sectional view taken along a line I-I' of FIG. 1.

FIG. 1 is a plan view illustrating a liquid crystal display (LCD) panel 500 according to Embodiment 1 of the present invention. FIG. 2 is a cross-sectional view taken along a line I-I' of FIG. 1.

Referring to FIGS. 1 and 2, an LCD panel 500 according to Embodiment 1 includes a display substrate 100, an opposite substrate 200 opposite to the display substrate 100 and a liquid crystal layer 300 interposed between the display substrate 100 and the opposite substrate 200.

The display substrate 100 includes a first base substrate 110 having a pixel area PA defined thereon. A first gate line GL1, a second gate line GL2, a first data line DL1 and a second data line DL2 are formed on the first base substrate 110. Each of the first and second gate lines GL1 and GL2 is crossed with the first and second data lines DL1 and DL2, respectively. A first thin-film transistor (TFT) SW1, a second TFT SW2 and a pixel electrode PE electrically connected to the first TFT SW1 and the second TFT SW2 are formed on the pixel area PA. A first storage line STL1 and a second storage line STL2 that are overlapped with the pixel electrode PE are formed on the pixel area PA. The display substrate 100 may further include a gate insulation layer 130, a passivation film 160, an organic insulation layer 170 and a first alignment layer 190.

The first and second gate lines GL1 and GL2 are extended along a first direction D1, and are arranged along a second direction D2 that is different from the first direction D1. The first gate line GL1 is connected to the first and second TFTs SW1 and SW2.

The first and second data lines DL1 and DL2 are extended along the second direction D2 crossing the first direction D1, and are arranged along the first direction D1. The first data line DL1 may deliver a first voltage, and the second data line DL2 may deliver a second voltage that is higher than the first voltage.

Each of the first and second TFTs SW1 and SW2 includes a gate electrode that is a current control electrode, a source electrode that is a current input electrode, and a drain electrode that is a current output electrode. The first TFT SW1 is connected to the first gate line GL1 and the first data line DL1. The first TFT SW1 includes a first gate electrode 121*a* connected to the first gate line GL1, a first source electrode 151*a* connected to the second data line DL2, a first drain electrode 153*a* spaced apart from the first source electrode 151 a, and a first active pattern 140*a*.

The second TFT SW2 is connected to the first gate line GL1 and the second data line DL2. The second TFT SW2 includes a second gate electrode 121*b* connected to the first gate line GL1, a second source electrode 151*b* connected to the first data line DL1, a second drain electrode 153*b* spaced apart from the second source electrode 151*b*, and a second active pattern 140*b*.

The pixel electrode PE includes a low pixel electrode LPE, a high pixel electrode HPE and a liquid crystal molecule control part 400.

The low pixel electrode LPE receives the first voltage through the first data line DL1. The low pixel electrode LPE makes contact with the first drain electrode 153*a* to be electrically connected to the first TFT SW1.

The low pixel electrode LPE includes a first contact pattern CNT1 and a bridge electrode BE. The low pixel electrode LPE includes a plurality of areas spaced apart from both sides of the high pixel electrode HPE with respect to the high pixel electrode HPE. The areas are physically and electrically connected to each other through the bridge electrode BE. In the present embodiment, the bridge electrode BE is formed at both sides of the high pixel electrode HPE. Alternatively, the bridge electrode BE may be formed at one side of the high pixel electrode HPE.

For example, each of the low pixel electrodes LPE includes a low main electrode portion LPE_a and a low sub-electrode portion LPE_b protruded from the low main electrode portion LPE_a toward the high pixel electrode HPE. The low sub-electrode portion LPE_b may be overlapped with the first and second storage lines STL1 and STL2.

The high pixel electrode HPE receives the second voltage through the second data line DL2. The high pixel electrode HPE makes contact with the second drain electrode 153*b*, thereby being electrically connected to the second TFT SW2. The high pixel electrode HPE is electrically and physically divided from the low pixel electrode LPE.

For example, the high pixel electrode HPE includes a high main electrode portion HPE_a and a high sub-electrode portion HPE_b, which is protruded from the high main electrode portion HPE_a toward the low pixel electrode LPE. The high sub-electrode portion HPE_b is substantially interlocked with the low sub-electrode portion LPE_b when viewed on a plane. The high sub-electrode portion HPE_b may be overlapped with the storage lines STL1 and STL2.

The liquid crystal molecule control part 400 is formed at a boundary portion between the low pixel electrode LPE and the high pixel electrode HPE in order to control liquid crystal molecules disposed at an area corresponding to the low and high pixel electrodes LPE and HPE. The liquid crystal molecule control part 400 may be formed at one of the low pixel electrode LPE and/or the high pixel electrode HPE. The liquid crystal molecule control part 400 may determine an arrangement direction of liquid crystal molecules disposed at a domain boundary so that a generating position of a singular point may be uniform.

For example, the liquid crystal molecule control part 400 has a first recess 403 formed at a first corner portion where the high electrode portion HPE_a and the high sub-electrode portion HPE_b meet each other. Moreover, the liquid crystal molecule control part 400 has a second recess 405 formed at a second corner portion where the low electrode portion LPE_a and the low sub-electrode portion LPE_b meet each other.

In the present embodiment, the liquid crystal molecule control part 400 is formed at the first and second corner portions. However, a forming portion of the liquid crystal molecule control part 400 is not limited to that example embodiment. For example, the liquid crystal molecule control part 400 may be formed at either one of the first or second corner portions.

Figure 3:
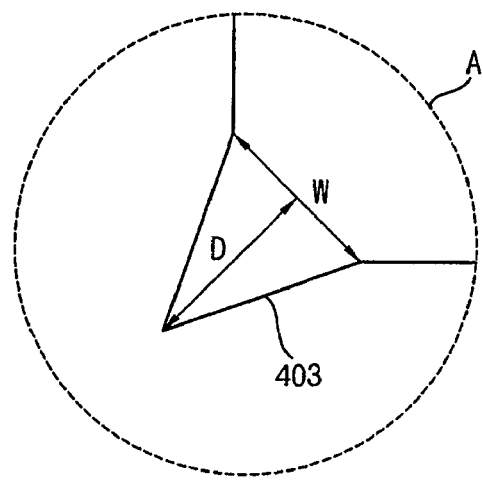
FIG. 3 is an enlarged view illustrating a first recess of FIG. 1.

FIG. 3 is an enlarged view illustrating a first recess 403 of FIG. 1.

Referring to FIG. 3, a maximum width 'W' of a first recess 403 may be about 7.5 μm, and a depth 'D' of the first recess 403 may be about 8.5 µm. Alternatively, the maximum width 'W' and depth 'D' of the first recess 403 may be different from a height of a stepped portion between the high main electrode portion HPE_a and the high sub-electrode portion HPE_b.

Referring again FIGS. 1 and 2, a size of the second recess 405 may be equal to that of the first recess 403.

In the present embodiment, the liquid crystal molecule control part 400 has a recess of a triangular shape. However, a shape of the liquid crystal molecule control part 400 is not limited to that example embodiment. For example, the shape of the liquid crystal molecule control part 400 may have various shapes such as a rectangular shape, a trapezoidal shape, a semicircular shape, etc.

As described above, according to one or more embodiments of the present invention, the liquid crystal molecule control part 400 may fix a position at which the singular point is generated, so that the generation of stains or afterimages may be prevented at a boundary of domain areas.

The gate insulation layer 130 is formed on the first base substrate 110 to cover the first and second gate lines GL1 and GL2, the first and second gate electrodes 121a and 121b and the storage lines STL1 and STL2.

The passivation film 160 is formed on the first base substrate 110 having the first and second data lines DL1 and DL2, the first and second source electrodes 151a and 151b and the first and second drain electrodes 153a and 153b. The organic insulation layer 170 is formed between the passivation film 160 and the low and high pixel electrodes LPE and HPE to planarize the first display substrate 100. The passivation film 160 and the organic insulation layer 170 include contact holes CNT1 (also referred to as "first contact pattern") and CNT2 (also referred to as "second contact pattern") which expose a first end portion of the first drain electrode 153a and a first end portion of the second drain electrode 153b.

A light alignment layer is formed on the first base substrate 110 having the low and high pixel electrodes LPE and HPE formed thereon, and then a UV light or laser beam is irradiated on the light alignment layer to form a pretilt angle so that the first alignment layer 190 is formed. For example, the pretilt angle may be about 85 degrees to about 89 degrees. The first alignment layer 190 may vertically align liquid crystal molecules of the liquid crystal layer 300 by the pretilt angle when no electric field is present.

In the present embodiment, the first alignment layer 190 is formed by using a light alignment method. However, a forming of the first alignment layer 190 is not limited to that example embodiment. For example, the first alignment layer 190 may be formed by using various methods such as a rubbing method, a reactive mesogens (RM) method, etc.

The opposite substrate 200 includes a second base substrate 210 opposite to the display substrate 100, a light-blocking pattern 220, a color filter 230, an overcoating layer 240, a common electrode layer 250 and a second alignment layer 260.

The light-blocking pattern 220 is formed on the second base substrate 210 to correspond with the gate lines GL1 and GL2, the data lines DL1 and DL2 and the TFTs SW1 and SW2. In one example, a metal layer is patterned through a photoetching process to form the light-blocking pattern 220. In another example, an organic material is printed to form the light-blocking pattern 220.

The color filter 230 is formed in a plurality of areas of the second base substrate 210 which is partitioned by the light-blocking pattern 220. The color filter 230 is formed on the second base substrate 210 to correspond with the low and high pixel electrodes LPE and HPE of the display substrate 100. The color filter 230 may include a red color filter, a green color filter and a blue color filter.

The overcoating layer 240 is formed between the second base substrate 210 and the common electrode layer 250 having the light-blocking pattern 220 and the color filter 230 formed thereon. The overcoating layer 240 may planarize the opposite substrate 200.

The common electrode layer 250 is formed on the overcoating layer 240. The common electrode layer 250 is opposite to the low and high pixel electrodes LPE and HPE, and is formed on a whole front surface of the second base substrate 210.

The second alignment layer 260 is formed on the common electrode layer 250. The second alignment layer 260 may be formed through a light alignment such as the first alignment layer 190. The second alignment layer 260 may vertically align liquid crystal molecules of the liquid crystal layer 300 by the pretilt angle when no electric field is present.

A first polarizing plate (not shown), which has a first polarizing axis with respect to the first direction D1 or the second direction D2, is combined with a first surface of the display substrate 100. A second polarizing plate (not shown), which has a second polarizing axis perpendicular to a direction of the first polarizing axis, is combined with a first surface of the opposite substrate 200. For example, a direction of the first polarizing axis may be the first direction D1, and a direction of the second polarizing axis may be the second direction D2.

Liquid crystal molecules of the liquid crystal layer 300 are vertically aligned with respect to the display substrate 100 and the opposite substrate 200, and are disposed between the first alignment layer 190 and the second alignment layer 260.

A pixel area PA on which the low pixel electrode LPE and the high pixel electrode HPE are formed is divided into a plurality of domains according to a direction in which a director of liquid crystal molecules included in the liquid crystal layer 300 is arranged due to a direction and a supplying electric field of the first and second alignment layers 190 and 260. Here, the domain denotes an area of liquid crystal molecules having the same arranging direction.

Figure 4:
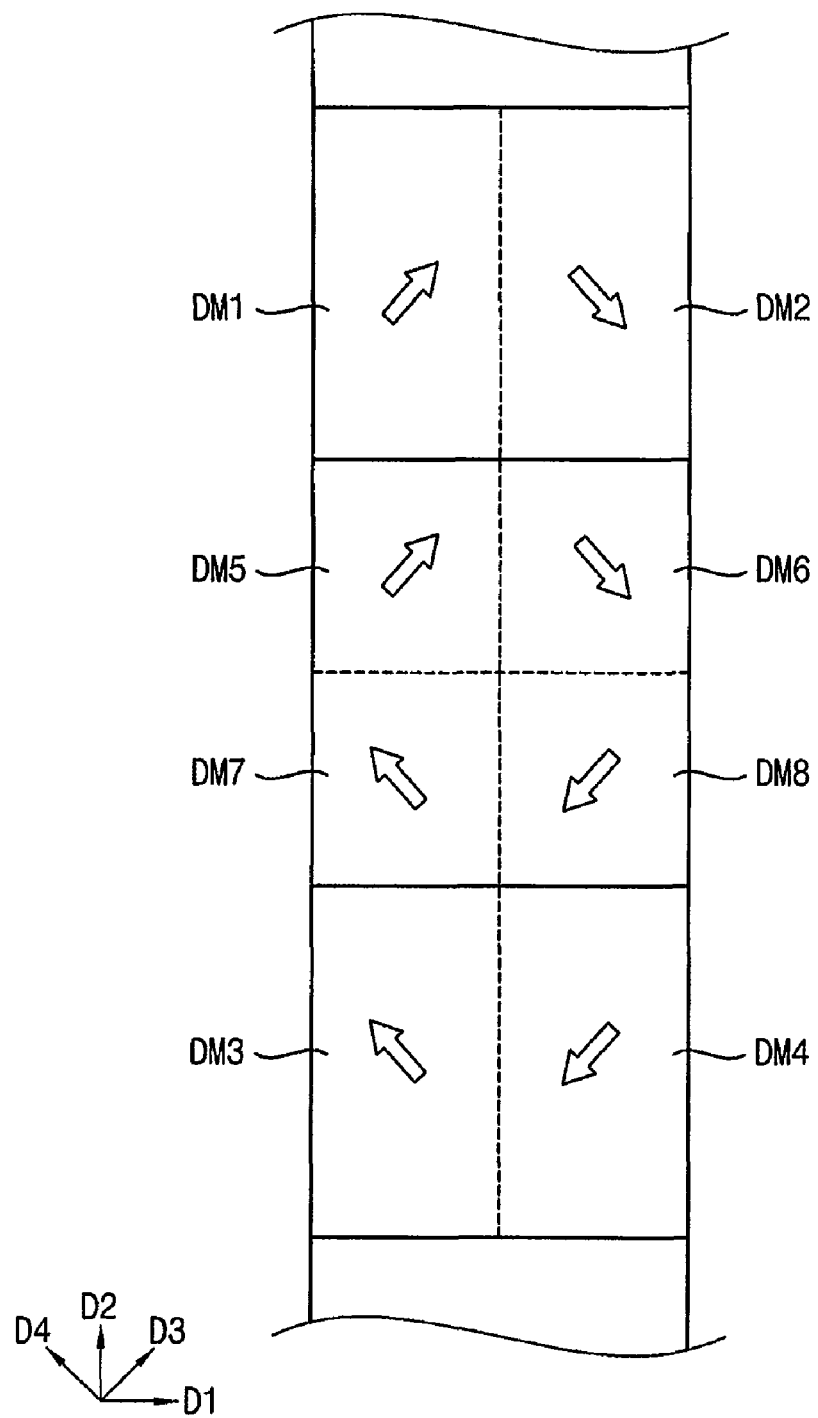
FIG. 4 is a schematic diagram illustrating a first example of an alignment direction of domain areas in an LCD panel as shown in FIG. 1.

FIG. 4 is a schematic diagram illustrating a first example of an alignment direction of domain areas in an LCD panel 500 as shown in FIG. 1.

Referring to FIG. 4, a pixel area PA according to the present embodiment is divided into a first domain DM1, a second domain DM2, a third domain DM3, a fourth domain DM4, a fifth domain DM5, a sixth domain DM6, a seventh domain DM7 and an eighth domain DM8. The first to fourth domains DM1, DM2, DM3 and DM4 correspond to an area where the low pixel electrode LPE is formed, and the fifth to eighth domains DM5, DM6, DM7 and DM8 correspond to an area where the high pixel electrode HPE is formed.

An alignment direction of the first domain DM1 may be a third direction D3 between the first direction D1 and the second direction D2, and an alignment direction of the third domain DM3 may be a fourth direction D4. An alignment direction of the second domain DM2 may be a reverse direction of the fourth direction D4, and an alignment direction of the fourth domain DM4 may be a reverse direction of the third direction D3.

An alignment direction of the fifth domain DM5 may be the third direction D3, and an alignment direction of the sixth domain DM6 may be a reverse direction of the fourth direction D4. An alignment direction of the seventh domain DM7 may be the fourth direction D4, and an alignment direction of the eighth domain DM8 may be a reverse direction of the third direction D3.

Figure 5:
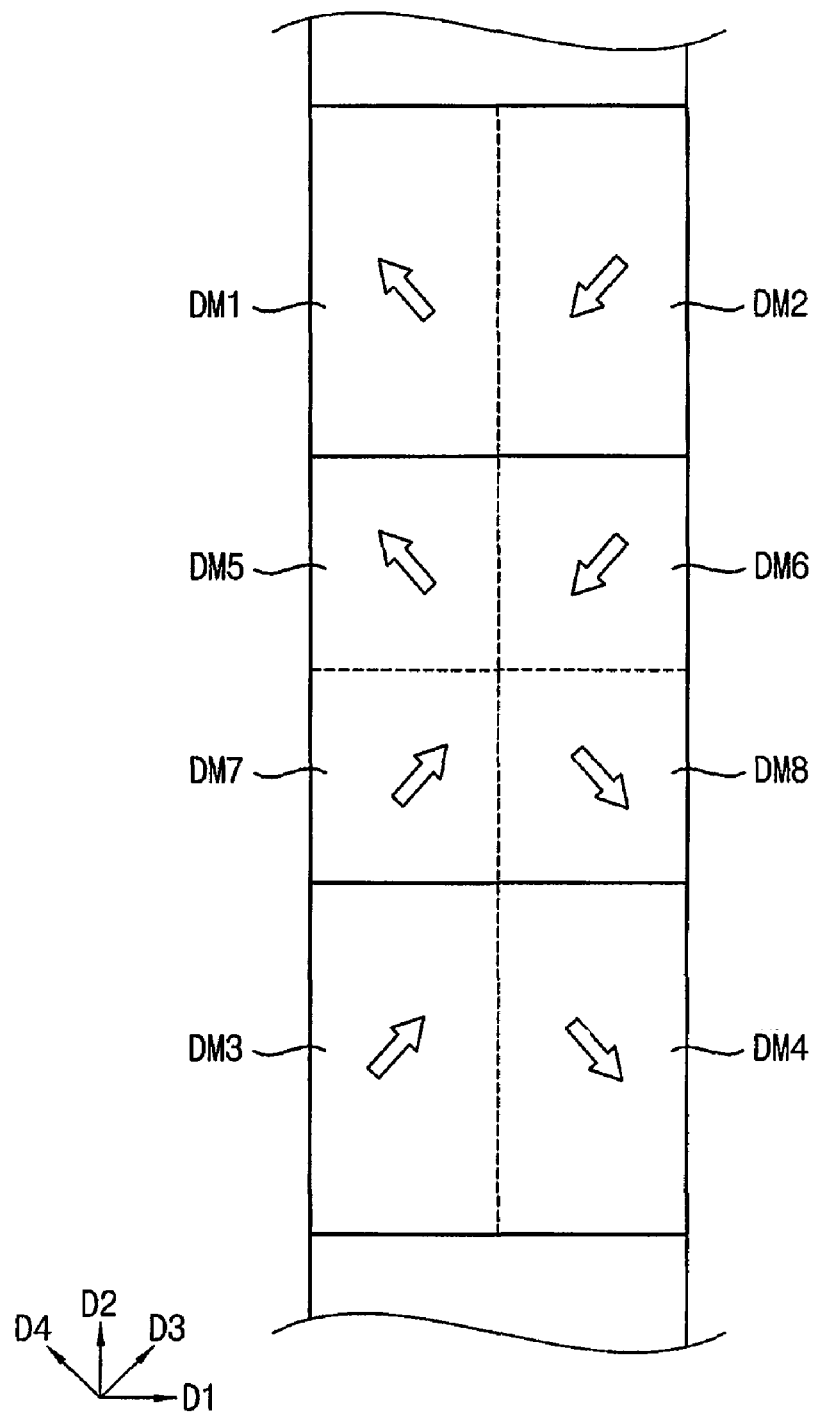
FIG. 5 is a schematic diagram illustrating another example of an alignment direction of domain areas in an LCD panel as shown in FIG. 1.

FIG. 5 is a schematic diagram illustrating a second example of an alignment direction of domain areas in an LCD panel 500 as shown in FIG. 1. The LCD panel is substantially the same as the LCD panel of the embodiment of FIG. 4 except for at least an alignment direction of first to eighth domains DM1 to DM8. Thus, identical reference numerals are used in FIG. 5 to refer to components that are the same or like those shown in FIG. 4, and thus, a detailed description thereof will be omitted.

Referring to FIG. 5, an alignment direction of the first domain DM1 may be the fourth direction D4, and an alignment direction of the second domain DM2 may be an inverse direction of the third direction D3. An alignment direction of the third domain DM3 may be the third direction D3, and an alignment direction of the fourth domain DM4 may be an inverse direction of the fourth direction D4.

An alignment direction of the fifth domain DM5 may be the fourth direction D4, and an alignment direction of the sixth domain DM6 may be an inverse direction of the third direction D3. An alignment direction of the seventh domain DM7 may be the third direction D3, and an alignment direction of the eighth domain DM8 may be an inverse direction of the fourth direction D4.

Alignment directions of the first to eighth domains DM1 to DM8 may be altered in accordance with a direction of the first and second alignment layers 190 and 260 and a supplying electric field.

In a boundary portion between the domains DM1 to DM8, an arrangement of liquid crystal is changed with respect to a direction of adjacent liquid crystal molecules, so that a singular point having no predetermined direction is generated. According to one or more embodiments of the present embodiment, the singular point is generated in a uniform position through the liquid crystal molecule control part 400, so that a residual image or a stain is not generated in the domain boundary.

Hereinafter, a method of manufacturing the display substrate 100 will be described according to one or more embodiments with reference to FIGS. 1 and 2.

Referring to FIGS. 1 and 2, a gate metal layer (not shown) is formed on the first base substrate 110, and then the gate metal layer is patterned through a photoetching process to form the gate lines GL1 and GL2, and the first and second gate electrodes 121a and 121b.

Next, the gate insulation layer 130 is formed on the first base substrate 110 to cover a plurality of gate patterns formed from the gate metal layer. For example, the gate patterns may include the gate lines GL1 and GL2, and the first and second gate electrodes 121a and 121b.

Next, a semiconductor layer 142 and an ohmic contact layer 144 are sequentially formed on the gate insulation layer 130, and then the semiconductor layer 142 and the ohmic contact layer 144 are patterned to form the first active pattern 140a and the second active pattern 140b. The first active pattern 140a is overlapped with the first gate electrode 121a, and the second active pattern 140b is overlapped with the second gate electrode 121b. The semiconductor layer 142 may include amorphous silicon, and the ohmic contact layer 144 may include amorphous silicon doped with n-type dopants at a high concentration, for example.

Next, a source metal layer (not shown) is formed on the first base substrate 110 having the first and second active patterns 140a and 140b formed thereon, and then the source metal layer is patterned through a photoetching process to form the data lines DL1 and DL2, the first and second source electrodes 151a and 151b, and the first and second drain electrodes 153a and 153b.

The passivation film 160 and the organic insulation layer 170 are sequentially formed on the first base substrate 110. The passivation film 160 may include, for example, a silicon nitride layer (SiNx) and a silicon oxide layer (SiOx). The organic insulation layer 170 may include a positive type photoresist composition, for example.

The organic insulation layer 170 of the first and second drain electrodes 153a and 153b is exposed and developed to expose the passivation film 160 formed on the first and second drain electrodes 153a and 153b. The exposed passivation film 160 is dry etched to expose a first edge portion of the first and second drain electrodes 153a and 153b.

Then, a transparent electrode layer (not shown) is formed on the first base substrate 110 having the passivation film 160 and the organic insulation layer 170 which expose a first edge portion of the first and second drain electrodes 153a and 153b. The transparent electrode layer is patterned to form the liquid crystal molecule control part 400 including the low pixel electrode LPE, the high pixel electrode HPE and the first and second recesses 403 and 405.

The first recess 403 is formed through the first corner portion where the high main electrode portion HPE_a and the high sub-electrode portion HPE_b meet each other, and the second recess 405 is formed through the second corner portion where the low main electrode portion LPE_a and the low sub-electrode portion LPE_b meet each other. In the present embodiment, the liquid crystal molecules control part 400 is formed on the first and second corner portions. Alternatively, the liquid crystal molecule control part 400 may be formed on either the first or second corner portions.

The first contact pattern CNT1 of the low pixel electrode LPE contacts a first end portion of the first drain electrode 153a, and the second contact pattern CNT2 of the high pixel electrode HPE contacts a first end portion of the second drain electrode 153b. The transparent electrode layer TE may include, for example, indium tin oxide (ITO) or indium zinc oxide (IZO).

Next, a first alignment layer 190 is formed on the first base substrate 110 having the low and high pixel electrodes LPE and HPE formed thereon to complete the display substrate 100.

Example Embodiment 2

Figure 6:
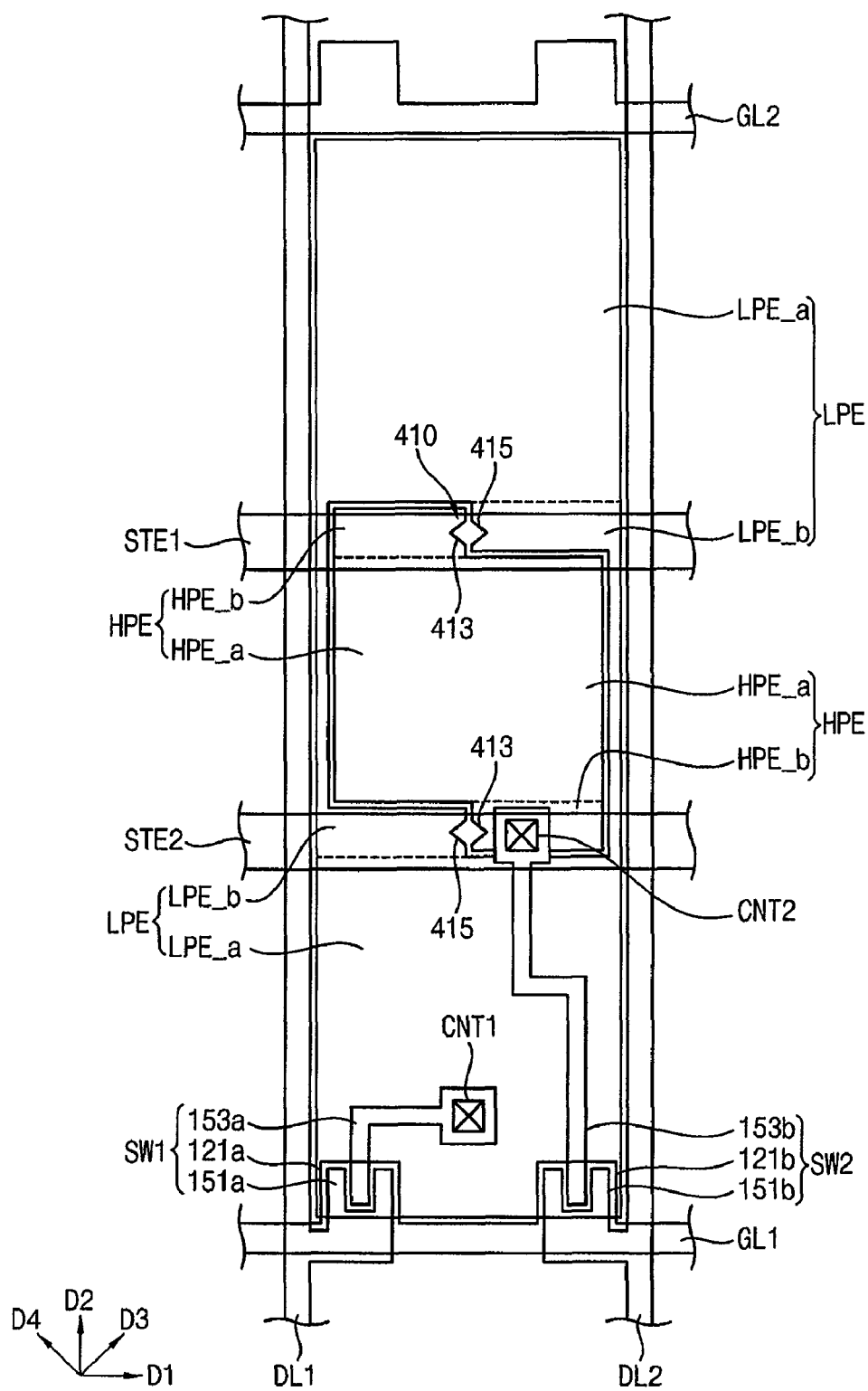
FIG. 6 is a plan view illustrating a display substrate according to Embodiment 2 of the present invention.

FIG. 6 is a plan view illustrating a display substrate according to Embodiment 2 of the present invention. The display substrate 102 is substantially the same as the display substrate 100 according to Embodiment 1 of FIGS. 1 and 2 except for at least a liquid crystal molecule control part 410. Thus, identical reference numerals are used in FIG. 6 to refer to components that are the same or like those shown in FIGS. 1 and 2, and thus, a detailed description thereof will be omitted.

Referring to FIG. 6, a display substrate 102 according to Embodiment 2 of the present invention includes the liquid crystal molecule control part 410. The liquid crystal molecule control part 410 has a third recess 413 and a fourth recess 415 formed therethrough.

The third recess 413 is formed on a side of the high sub-electrode portion HPE_b facing the low sub-electrode portion LPE_b.

The fourth recess 415 is formed on a side of the low sub-electrode portion LPE_b facing the high sub-electrode portion HPE_b.

In the third and fourth recesses 413 and 415, as described with respect to the embodiment in FIG. 3, each of maximum widths 'W' may be about 7.5 μm and each of depths 'D' may be about 8.5 μm. However, it is not limited to that example embodiment. For example, the maximum width and the depth may be altered in accordance with a stepped difference between the high main electrode portion HPE_a and the high sub-electrode portion HPE_b and a stepped difference between the low main electrode portion LPE_a and the low sub-electrode portion LPE_b.

In the present embodiment, shapes of the third and fourth recesses 413 and 415 are a triangular shape. However, the shapes of the third and fourth recesses 413 and 415 are not limited to that example embodiment. For example, the third and fourth recesses 413 and 415 may have various shapes such as a rectangular shape, a trapezoidal shape, a semicircular shape, etc. That is, the shapes of the third and fourth recesses 413 and 415 may be varied so as to strengthen an electric field corresponding to the liquid crystal molecules control part 410 rather than an adjacent electric field.

A method of manufacturing the display substrate 102 according to the present embodiment is the same as the method of manufacturing the display substrate 100 according to Embodiment 1 as described in FIGS. 1 and 2, so that any further explanation concerning the above elements will be omitted.

A transparent electrode layer (not shown) is formed on the first base substrate 110, and then the transparent electrode layer is patterned to form the liquid crystal molecule control part 410 including the low and high pixel electrodes LPE and HPE, and the third and fourth recesses 413 and 415. The third recess 413 may be formed in a side of the high sub-electrode portion HPE_b facing the low sub-electrode portion LPE_b, and the fourth recess 415 may be formed in a side of the low sub-electrode portion LPE_b facing the high sub-electrode portion HPE_b.

Example Embodiment 3

Figure 7:
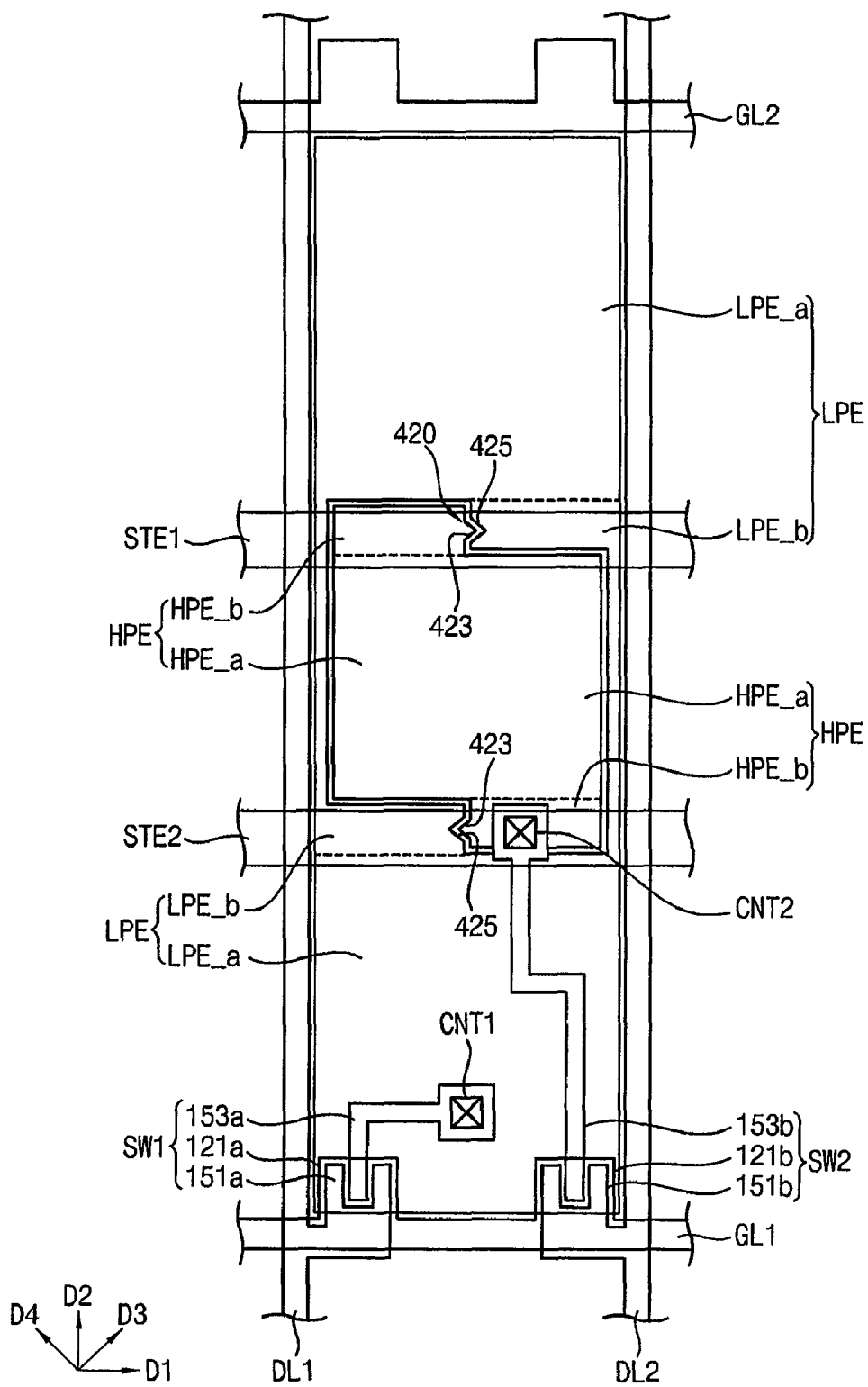
FIG. 7 is a plan view illustrating a display substrate according to Embodiment 3 of the present invention.

FIG. 7 is a plan view illustrating a display substrate according to Embodiment 3 of the present invention. The display panel 103 is substantially the same as the display panel 100 of the embodiments of FIGS. 1 and 2 except for at least a liquid crystal molecule control part 420. Thus, identical reference numerals are used in FIG. 7 to refer to components that are the same or like those shown in FIGS. 1 and 2, and thus, a detailed description thereof will be omitted.

Referring to FIG. 7, a display substrate 103 according to Embodiment 3 of the present invention includes liquid crystal molecule control part 420. The liquid crystal molecule control part 420 includes a first protruded portion 423 and a fifth recess 425 formed therethrough.

The first protruded portion 423 is formed in a side of the high sub-electrode portion HPE_b facing the low sub-electrode portion LPE_b.

The fifth recess 425 is formed in a side of the low sub-electrode portion LPE_b facing the high sub-electrode portion HPE_b.

Each maximum width 'W' of the first protruded portion 423 and the fifth recess 425 may be about 7.5 µm, and each depth 'D' of the first protruded portion 423 and the fifth recess 425 may be about 8.5 µm, as described with respect to the embodiment in FIG. 3. However, it is not limited to that example embodiment. A size of the first protruded portion 423 may be altered in accordance with a distance between the low sub-electrode portion LPE_b and the high sub-electrode portion HPE_b.

In the present embodiment, shapes of the first protruded portion 423 and the fifth recess 425 are a triangular shape. However, the shapes of the first protruded portion 423 and the fifth recess 425 are not limited to that example embodiment. For example, the first protruded portion 423 and fifth recess 425 may have various shapes such as a rectangular shape, a trapezoidal shape, a semicircular shape, etc.

A method of manufacturing the display substrate 103 according to the present embodiment is the same as the method of manufacturing the display substrate 100 according to Embodiment 1 as described in FIGS. 1 and 2, so that any further explanation concerning the above elements will be omitted.

A transparent electrode layer (not shown) is formed on the first base substrate 110, and then the transparent electrode layer is patterned to form the liquid crystal molecule control part 420 including the low and high pixel electrodes LPE and HPE, the first protruded portion 423 and the fifth recess 425. The first protruded portion 423 may be formed in a side of the high sub-electrode portion HPE_b facing the low sub-electrode portion LPE_b, and the fifth recess 425 may be formed in a side of the low sub-electrode portion LPE_b facing the high sub-electrode portion HPE_b.

Example Embodiment 4

Figure 8:
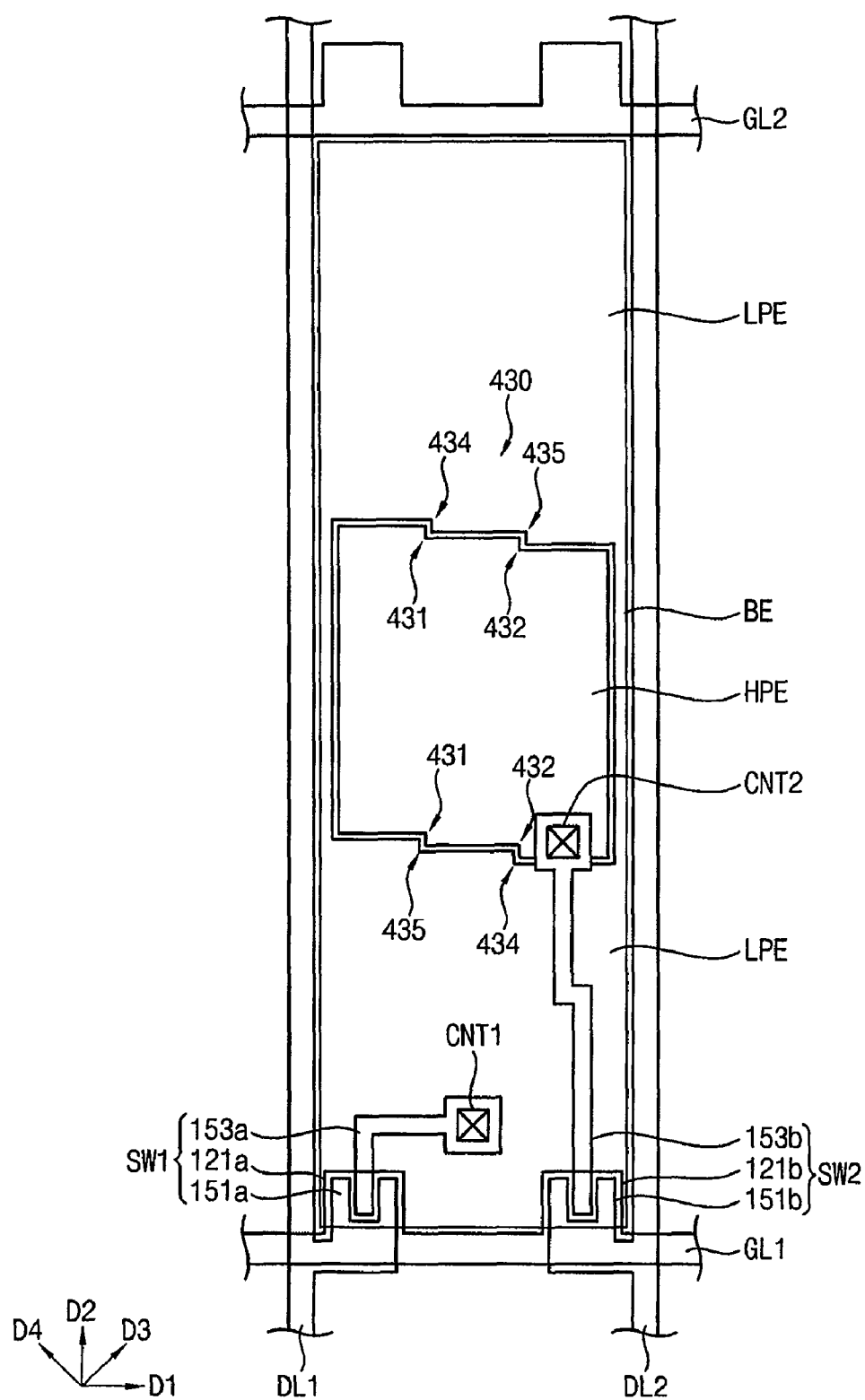
FIG. 8 is a plan view illustrating a display substrate according to Embodiment 4 of the present invention.

FIG. 8 is a plan view illustrating a display substrate according to Embodiment 4 of the present invention. The display panel 104 is substantially the same as the display panel 100 according to Embodiment 1 of FIGS. 1 and 2 except for at least a shape of a liquid crystal molecule control part 430. Thus, identical reference numerals are used in FIG. 8 to refer to components that are the same or like those shown in FIGS. 1 and 2, and thus, a detailed description thereof will be omitted.

Referring to FIG. 8, a display substrate 104 according to Embodiment 4 of the present invention includes the liquid crystal molecule control part 430.

The liquid crystal molecule control part 430 includes a plurality of first stepped portions 431 and 432, and a plurality of second stepped portions 434 and 435. The first stepped portions 431 and 432 are formed in a side of the high pixel electrode HPE facing the low pixel electrode LPE.

The second stepped portions 434 and 435 are formed in a side of the low pixel electrode LPE facing the high pixel electrode HPE.

As described above, according to the present embodiment, a position where the singular point is generated may be controlled through the first and second stepped portions 431, 432, 434 and 435, so that the generation of stains or afterimages maybe prevented at a boundary of domain areas.

In the present embodiment, the liquid crystal molecule control part 430 has two stepped differences. However, it is not limited to that example embodiment. For example, the liquid crystal molecule control part 430 may have various numbers of stepped differences such as one stepped difference, three stepped differences, etc.

A method of manufacturing the display substrate 104 according to the present embodiment is the same as the method of manufacturing the display substrate 100 according to Embodiment 1 described in FIGS. 1 and 2, so that any further explanation concerning the above elements will be omitted.

A transparent electrode layer (not shown) is formed on the first base substrate 110, and then the transparent electrode layer is patterned to form the liquid crystal molecule control part 430 including the low and high pixel electrodes LPE and HPE, and the plurality of first and second stepped portions 431, 432, 434 and 435. The plurality of first stepped portions 431 and 432 may be formed in a side of the high electrode HPE facing the low pixel electrode LPE, and the plurality of second stepped portions 434 and 435 may be formed in a side of the low pixel electrode LPE facing the high pixel electrode HPE.

Example Embodiment 5

Figure 9:
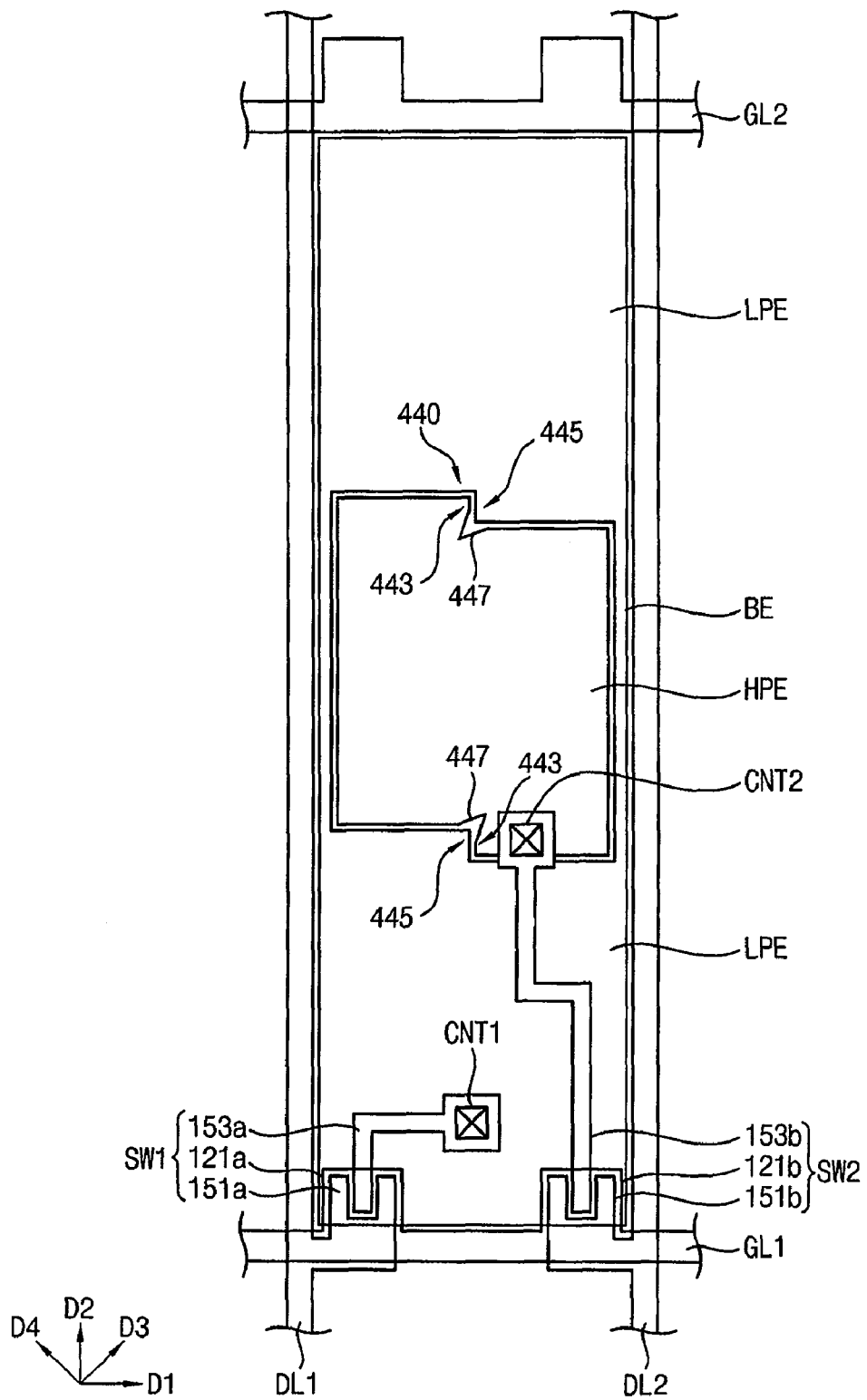
FIG. 9 is a plan view illustrating a display substrate according to Embodiment 5 of the present invention.

FIG. 9 is a plan view illustrating a display substrate according to Embodiment 5 of the present invention.

The display substrate 105 according to the present embodiment is substantially the same as the display substrate 100 according to Embodiment 1 of FIGS. 1 and 2 except for at least a shape of a liquid crystal molecule control part 440. Thus, identical reference numerals are used in FIG. 9 to refer to components that are the same or like those shown in FIGS. 1 and 2, and thus, a detailed description thereof will be omitted.

Referring to FIG. 9, a display substrate 105 according to Embodiment 5 of the present invention includes the liquid crystal molecule control part 440.

The liquid crystal molecule control part 440 has a third stepped portion 443, a fourth stepped portion 445 and a sixth recess 447 that are formed therethrough.

The third stepped portion 443 is formed in a side of the high pixel electrode HPE facing the low pixel electrode LPE.

The fourth stepped portion 445 is formed in a side of the low pixel electrode LPE facing the high pixel electrode HPE.

The sixth recess 447 is formed in a corner portion where stepped surfaces forming the third stepped portion 443 meet each other.

In the present embodiment, the sixth recess 447 is formed in a corner portion where stepped surfaces forming the third stepped portion 443 meet each other. However, it is not limited to that example embodiment. For example, a portion where stepped surfaces meet each other may be transformed to form a recess.

A method of manufacturing the display substrate 105 according to the present embodiment is the same as the method of manufacturing the display substrate 100 according to Embodiment 1 described in FIGS. 1 and 2, so that any further explanation concerning the above elements will be omitted.

A transparent electrode layer (not shown) is formed on the first base substrate 110, and then the transparent electrode layer is patterned to form the liquid crystal molecule control part 440 including the low and high pixel electrodes LPE and HPE, the third stepped portion 443, the fourth stepped portion 445, and the sixth recess 447 formed thereon. For example, the third stepped portion 443 may be formed in a side of the high pixel electrode HPE facing the low pixel electrode portion LPE, and the fourth stepped portion 445 may be formed in a side of the low pixel electrode LPE facing the high pixel electrode HPE. Moreover, the sixth recess 447 may be formed in a corner portion where stepped surfaces forming the third stepped portion 443 meet each other.

Example Embodiment 6

Figure 10:
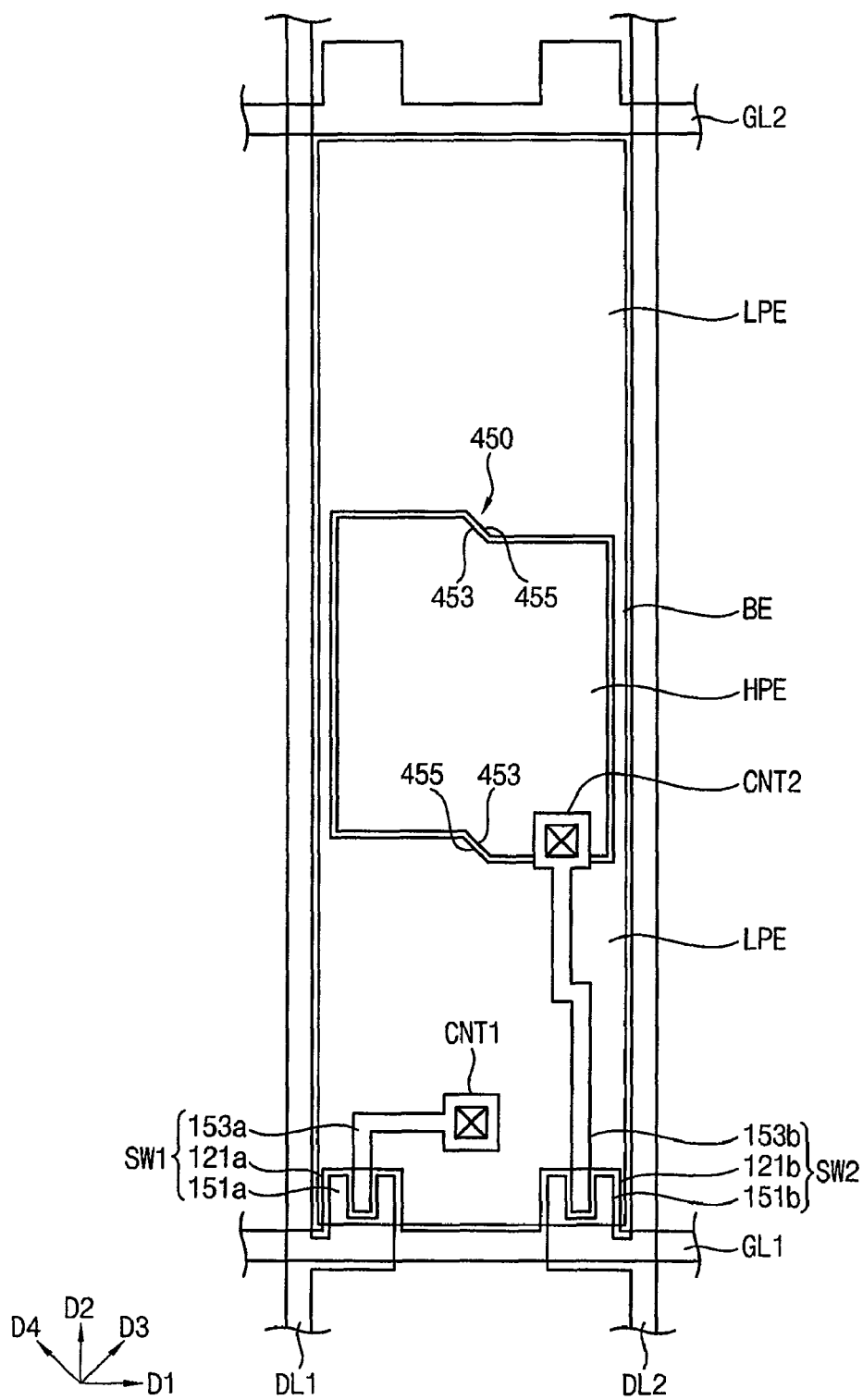
FIG. 10 is a plan view illustrating a display substrate according to Embodiment 6 of the present invention.

FIG. 10 is a plan view illustrating a display substrate according to Embodiment 6 of the present invention. The display substrate 106 is substantially the same as the display substrate 100 according to Embodiment 1 of FIGS. 1 and 2 except for at least a shape of a liquid crystal molecule control part 450. Thus, identical reference numerals are used in FIG. 10 to refer to components that are the same or like those shown in FIGS. 1 and 2, and thus, a detailed description thereof will be omitted.

Referring to FIG. 10, a display substrate 106 according to Embodiment 6 of the present invention includes the liquid crystal molecule control part 450.

The liquid crystal molecule control part 450 includes a fifth stepped portion 453 formed in a side of the high pixel electrode HPE facing the low pixel electrode LPE, and a sixth stepped portion 455 formed in a side of the low pixel electrode LPE facing the high pixel electrode HPE.

The fifth and sixth stepped portions 453 and 455 are formed so that a boundary surface between the stepped surfaces forming a stepped difference has a predetermined slope.

An electric field corresponding to corner portions where the stepped surface and a boundary surface meet each other in the fifth and sixth stepped portions 453 and 455 is stronger than that of an adjacent area, so that a singular point is generated. Therefore, a generation position of the singular point may be fixed, so that a residual image and a stain are not generated at a domain boundary.

A method of manufacturing the display substrate 106 according to the present embodiment is the same as the method of manufacturing the display substrate 100 according to Embodiment 1 described in FIGS. 1 and 2, so that any further explanation concerning the above elements will be omitted.

A transparent electrode layer (not shown) is formed on the first base substrate 110, and then the transparent electrode layer is patterned to form the liquid crystal molecule control part 450 including the low and high pixel electrodes LPE and HPE, and the fifth and sixth stepped portions 453 and 455. For example, the fifth stepped portion 453 may be formed in a side of the high pixel electrode HPE facing the low pixel electrode LPE, and the sixth stepped portion 455 may be formed in a side of the low pixel electrode LPE facing the high pixel electrode HPE.

Example Embodiment 7

Figure 11:
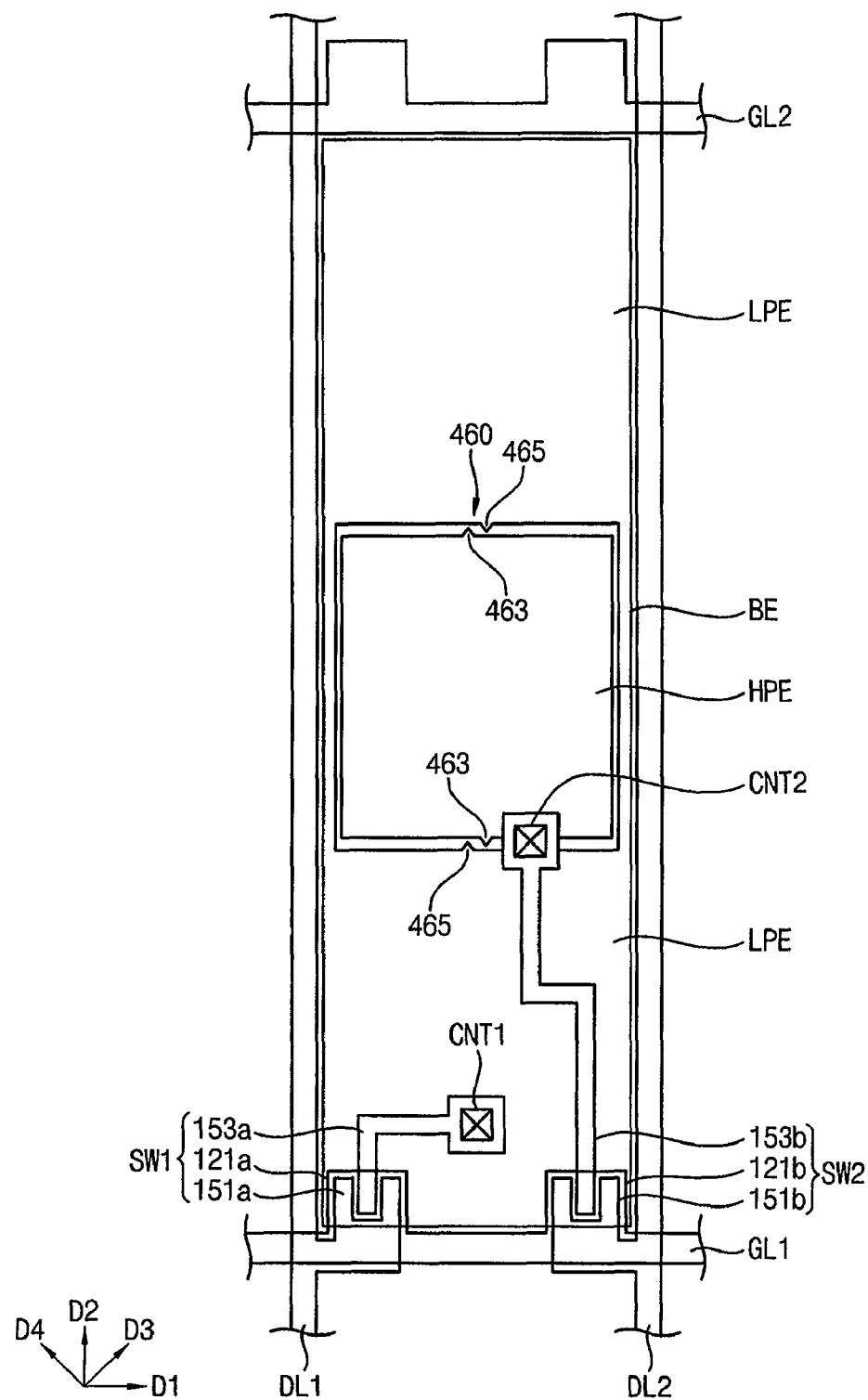
FIG. 11 is a plan view illustrating a display substrate according to Embodiment 7 of the present invention.

FIG. 11 is a plan view illustrating a display substrate according to Embodiment 7 of the present invention. The display substrate 107 is substantially the same as the display substrate 100 according to Embodiment 1 of FIGS. 1 and 2 except for at least a shape of a liquid crystal molecule control part 460. Thus, identical reference numerals are used in FIG. 11 to refer to components that are the same or like those shown in FIGS. 1 and 2, and thus, a detailed description thereof will be omitted.

Referring to FIG. 11, a display substrate 107 according to Embodiment 7 of the present invention includes the liquid crystal molecule control part 460.

The liquid crystal molecule control part 460 includes a second protruded portion 463 and a third protruded portion 465.

The second protruded portion 463 is formed in a side of the high pixel electrode HPE facing the low pixel electrode LPE.

The third protruded portion 465 is formed in a side of the low pixel electrode LPE facing the high pixel electrode HPE. The third protruded portion 465 is substantially interlocked with the second protruded portion 463.

An electric field corresponding to portions where the second and third protruded portions 463 and 465 are formed is strong in comparison with an adjacent area, so that a singular point is generated. Therefore, a generation position of the singular point may be fixed due to the second and third protruded portions 463 and 465, so that a residual image and a stain may be prevented from being generated at a domain boundary corresponding to a boundary portion between the low pixel electrode LPE and the high pixel electrode HPE.

In this embodiment, the liquid crystal molecules control part 460 is formed in both the high pixel electrode HPE and the low pixel electrode LPE. However, it is not limited that example embodiment. Alternatively, the liquid crystal molecule control part 460 may be formed at either one of the high pixel electrode HPE or the low pixel electrode LPE. Moreover, the second and third protruded portions 463 and 465 have a recess of a triangular shape, however, it is not limited to that example embodiment. For example, the second and third protruded portions 463 and 465 may have various shapes such as a rectangular shape, a trapezoidal shape, a semicircular shape, etc.

A method of manufacturing the display substrate 107 according to the present embodiment is the same as the method of manufacturing the display substrate 100 according to Embodiment 1 described in FIGS. 1 and 2, so that any further explanation concerning the above elements will be omitted.

The transparent electrode layer (not shown) is patterned to form the liquid crystal molecule control part 460 including the low and high pixel electrodes LPE and HPE, and the second and third protruded portions 463 and 465. For example, the second protruded portion 463 may be formed in a side of the high electrode HPE facing the low pixel electrode LPE, and the third protruded portion 465 may be formed in a side of the low pixel electrode LPE facing the high pixel electrode HPE. The third protruded portion 465 may be substantially interlocked with the second protruded portion 463.

Example Embodiment 8

Figure 12:
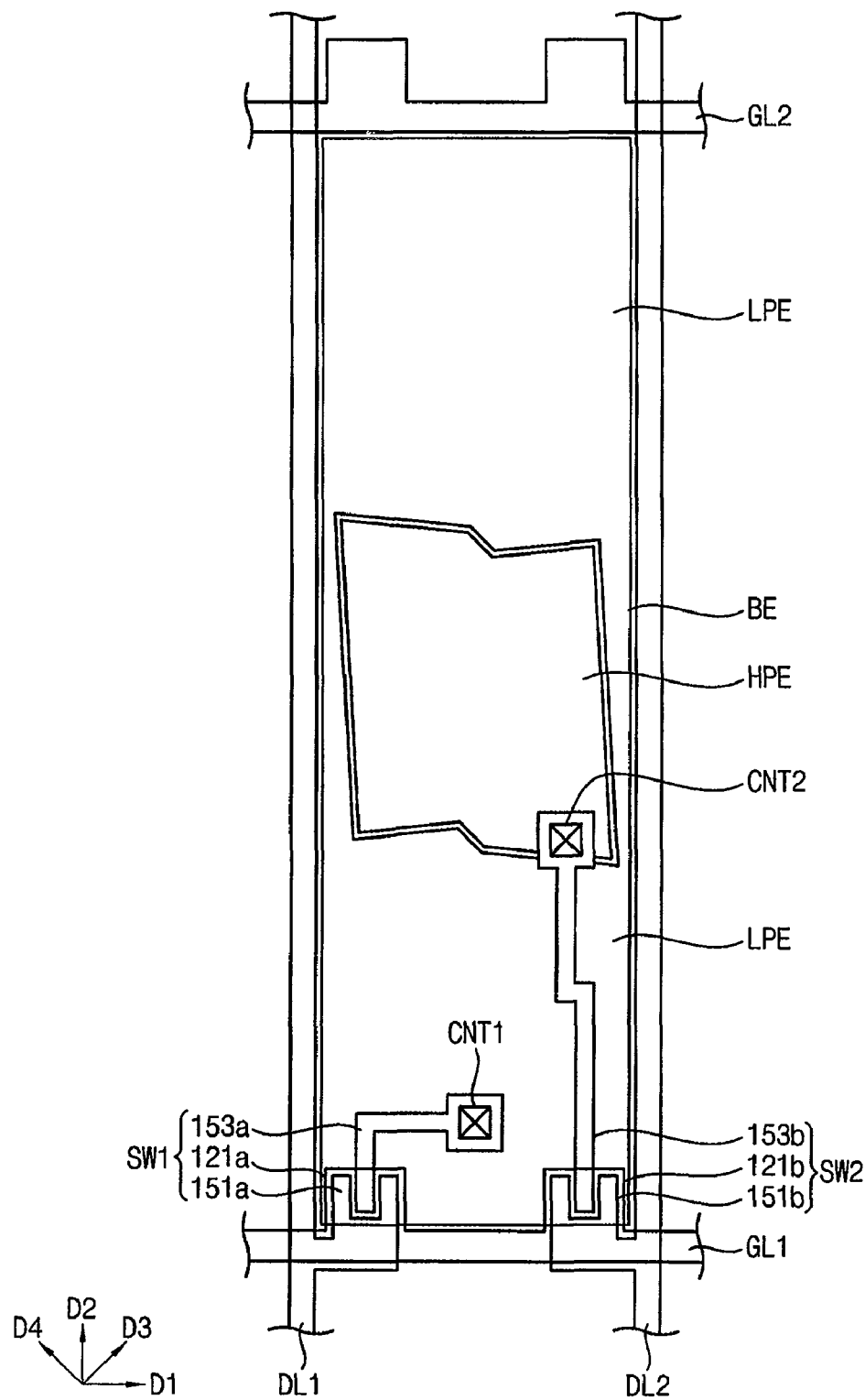
FIG. 12 is a plan view illustrating a display substrate according to Embodiment 8 of the present invention.

FIG. 12 is a plan view illustrating a display substrate according to Embodiment 8 of the present invention. The display substrate 108 is substantially the same as the display panel 100 according to Embodiment 1 of FIGS. 1 and 2 except that a high pixel electrode HPE is inclined. Thus, identical reference numerals are used in FIG. 12 to refer to components that are the same or like those shown in FIGS. 1 and 2, and thus, a detailed description thereof will be omitted.

Referring to FIG. 12, a display substrate 108 according to Embodiment 8 of the present invention includes a low pixel electrode LPE and a high pixel electrode HPE.

The low pixel electrode LPE has a plurality of areas formed to be spaced apart from both sides of the high pixel electrode HPE in comparison with the high pixel electrode HPE. The areas are electrically connected to each other through the bridge electrode BE.

The high pixel electrode HPE is formed in an inclined direction with respect to the second direction D2, for example, in the fourth direction D4.

An inclination angle of the high pixel electrode HPE may be determined by considering an alignment direction of liquid crystal molecules arranged in a domain boundary corresponding to a boundary of the high pixel electrode HPE.

In the present embodiment, a side defined by the high pixel electrode HPE and the low pixel electrode LPE facing the high pixel electrode HPE is inclined with respect to the data line, however, it is not limited that example embodiment. Alternatively, the low pixel electrode LPE may be inclined in an inclined direction with respect to the data line.

Moreover, in the present embodiment, the first data line DL1 has a higher stepped difference than the second data line DL2 at a side of the high pixel electrode HPE. Alternatively, the second data line DL2 may have a higher stepped difference than the first data line DL1. For example, a side of the low pixel electrode LPE facing the high pixel electrode HPE may be transformed in correspondence with a shape of the high pixel electrode HPE.

Furthermore, when a stepped difference is formed at a side of the low and high pixel electrodes LPE and HPE, stepped surfaces forming the stepped difference may be formed to have the different slope with respect to a boundary surface between the stepped surfaces.

As described above, when the high pixel electrode HPE is formed to have a predetermined slope, a response speed of liquid crystal molecules disposed in a domain corresponding to a boundary of the low pixel electrode LPE may be fast so that light transmittance passing through a liquid crystal layer may be enhanced.

Although it is not illustrated in the figure, a liquid crystal control part according to Embodiments 1 to 7 may be employed in a structure of the low and high pixel electrodes LPE and HPE according to one or more embodiments of the present invention. Here, the generation of stains or afterimages may be prevented at a boundary of domain areas, and light transmittance passing through the liquid crystal layer may be enhanced, so that display quality of the LCD panel may be enhanced.

In the above LCD panel according to one or more embodiments, the pixel area PA may be divided into two low pixel areas and one high pixel area, and each of the low and high pixel areas is divided into four domains, however, it is not limited to that example embodiment. For example, the pixel area PA may be divided into a low pixel area and a high pixel area, and each of the low and high pixel areas may be divided into a plurality of domains.

Embodiments of the present invention may be employed in an LCD panel in which an electrode controlling liquid crystal molecules is patterned and a pixel electrode is divided into a plurality of domains.

As described above, according to one or more embodiments of the present invention, a pixel electrode may be divided into two sub-pixel electrodes and a different voltage may be applied to each pixel, so that a wide viewing angle may be realized. Moreover, a position where the singular point is generated may be controlled through the liquid crystal molecule control part, so that the generation of stains or afterimages may be prevented at a boundary of domain areas.

Moreover, a pixel electrode may be formed to have a predetermined slope, so that liquid crystal molecules positioned at a domain boundary may be arranged uniformly so that light transmittance passing through the liquid crystal layer may be enhanced.

The foregoing embodiments are illustrative of the present disclosure and are not to be construed as limiting thereof. Although a few example embodiments of the present invention have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific example embodiments disclosed, and that modifications to the disclosed example embodiments, as well as other example embodiments, are intended to be included within the scope of the appended claims. Embodiments of the present invention are defined by the following claims, with equivalents of the claims to be included therein.

What is claimed is:

1. A display substrate comprising:
 a base substrate having a pixel area defined thereon; and
 a pixel electrode comprising a low pixel electrode formed in the pixel area to receive a first voltage, a high pixel electrode spaced apart from the low pixel electrode along a first direction to receive a second voltage that is higher than the first voltage, and a liquid crystal molecule control part formed on at least one of the low and high pixel electrodes so as to control liquid crystal molecules disposed at an area corresponding to a boundary of the low and high pixel electrodes.

2. The display substrate of claim 1, wherein a pixel area where the low pixel electrode is formed comprises a plurality of areas spaced apart from each other along the first direction to be electrically connected to each other, and the areas are formed at two portions of the high pixel electrode.

3. The display substrate of claim 2, wherein the liquid crystal molecule control part comprises:
a second protruded portion formed at a side of the high pixel electrode facing the low pixel electrode; and a third protruded portion formed at a side of the low pixel electrode facing the high pixel electrode, the third protruded portion being substantially interlocked with the second protruded portion.

4. The display substrate of claim 3, wherein at least one of the low pixel electrode and the high pixel electrode is inclined in an inclined direction with respect to the first direction.

5. The display substrate of claim 1, further comprising:
at least one of storage line disposed at a boundary area between the low pixel electrode and the high pixel electrode, wherein the storage line overlaps with each of the low pixel electrode and the high pixel electrode.

6. The display substrate of claim 5, wherein the low pixel electrode comprises a low main electrode portion and a low sub-electrode portion protruded from the low main electrode portion toward the high pixel electrode, wherein the low pixel electrode overlaps with the storage line, and
the high pixel electrode comprises a high main electrode portion and a high sub-electrode portion crossly protruded from the high main electrode portion toward the low pixel electrode in a zigzag pattern, wherein the high pixel electrode overlaps with the storage line.

7. The display substrate of claim 6, wherein the liquid crystal molecule control part has a first recess formed at a corner portion where the high main electrode portion and the high sub-electrode portion meet each other.

8. The display substrate of claim 6, wherein the liquid crystal molecule control part has a second recess formed at a corner portion where the low main electrode portion and the low sub-electrode portion meet each other.

9. The display substrate of claim 6, wherein the liquid crystal molecule control part comprises at least one of a third recess formed at a side of the high sub-electrode portion facing the low sub-electrode portion and a fourth recess formed at a side of the low sub-electrode portion facing the high sub-electrode portion.

10. The display substrate of claim 6, wherein the liquid crystal molecule control part comprises at least one of a first protruded portion formed at a side of the high sub-electrode portion facing the low sub-electrode portion and a fifth recess formed at a side of the low sub-electrode portion facing the high sub-electrode portion.

11. The display substrate of claim 1, wherein the liquid crystal molecule control part comprises:
at least one first stepped portion formed at a side of the low pixel electrode facing the high pixel electrode; and
at least one second stepped portion formed at a side of the high pixel electrode facing the low pixel electrode, the second stepped portion being crossed with the first stepped portion.

12. The display substrate of claim 11, wherein the liquid crystal molecule control part further comprises:
at least one sixth recess formed at an upper corner portion of the high pixel electrode where stepped surfaces forming a third stepped portion meet each other; and at least one seventh recess formed at a lower corner portion of the high pixel electrode where stepped surfaces forming a fourth stepped portion meet each other.

13. The display substrate of claim 1, wherein at least one side of the high pixel electrode has a stepped portion, the stepped portion oriented at an incline with respect the a remainder of its side.

14. A liquid crystal display panel comprising:
a display substrate comprising a pixel electrode, the pixel electrode comprising a low pixel electrode receiving a first voltage, a high pixel electrode spaced apart from the low pixel electrode along a first direction to receive a second voltage that is higher than the first voltage, and a liquid crystal molecule control part formed on at least one of the low and high pixel electrodes so as to control liquid crystal molecules disposed at an area corresponding to a boundary of the low and high pixel electrodes;
an opposite substrate comprising a common electrode; and
a liquid crystal layer interposed between the display substrate and the opposite substrate.

15. The liquid crystal display panel of claim 14, wherein a pixel area on which the low and high pixel electrodes are formed is divided into plural domains along a direction where a director of liquid crystal molecules of the liquid crystal layer is arranged when an electric field is applied thereto.

16. The liquid crystal display panel of claim 14, wherein a pixel area where the low pixel electrode is formed comprises a plurality of areas spaced apart from each other along the first direction to be electrically connected to each other, wherein one area of the plurality of areas is positioned adjacent to a first side of the high pixel electrode, and another area of the plurality of areas is positioned adjacent to a second side of the high pixel electrode that is opposite to the first side.

17. A liquid crystal display panel comprising:
a display substrate comprising a low pixel electrode which receives a first voltage and a high pixel electrode spaced apart from the low pixel electrode along a first direction to receive a second voltage that is higher than the first voltage, the high pixel electrode inclined along an inclined direction with respect to the first direction so as to control liquid crystal molecules disposed at an area corresponding to a boundary of the low and high pixel electrodes;
an opposite substrate comprising a common electrode; and
a liquid crystal layer interposed between the display substrate and the opposite substrate.

18. The liquid crystal display panel of claim 17, wherein the low pixel electrode is inclined in the inclined direction.

19. The liquid crystal display panel of claim 17, wherein a pixel area on which the low and high pixel electrodes are formed is divided into plural domains along a direction where a director of liquid crystal molecules of the liquid crystal layer is arranged when an electric field is applied thereto.

* * * * *